(12) United States Patent
Rossi et al.

(10) Patent No.: US 11,618,195 B2
(45) Date of Patent: *Apr. 4, 2023

(54) APPARATUS FOR INJECTION MOLDING OF PLASTIC MATERIALS

(71) Applicant: INGLASS S.p.A., San Polo di Piave (IT)

(72) Inventors: Massimo Rossi, San Polo di Piave (IT); Massimo De Nadai, San Polo di Piave (IT); Massimo Bisetto, San Polo di Piave (IT)

(73) Assignee: INGLASS S.p.A.

( * ) Notice: Subject to any disclaimer, the term of this patent is extended or adjusted under 35 U.S.C. 154(b) by 0 days.

This patent is subject to a terminal disclaimer.

(21) Appl. No.: 17/174,562

(22) Filed: Feb. 12, 2021

(65) Prior Publication Data

US 2021/0170650 A1 Jun. 10, 2021

Related U.S. Application Data

(63) Continuation-in-part of application No. 16/251,134, filed on Jan. 18, 2019, now Pat. No. 10,974,426.

(30) Foreign Application Priority Data

Mar. 13, 2018 (IT) .................. 102018000003490

(51) Int. Cl.
*B29C 45/27* (2006.01)
*B29C 45/17* (2006.01)
(Continued)

(52) U.S. Cl.
CPC ...... *B29C 45/2737* (2013.01); *B29C 45/1775* (2013.01); *B29C 45/281* (2013.01);
(Continued)

(58) Field of Classification Search
CPC .............. B29C 45/2737; B29C 45/281; B29C 45/7331; B29C 45/74; B29C 2045/2753;
(Continued)

(56) References Cited

U.S. PATENT DOCUMENTS 6,729,871 B2* 5/2004 Sattler ................. B29C 45/2806
425/566
7,121,820 B2* 10/2006 Tooman ................ B29C 45/281
425/566

(Continued)

FOREIGN PATENT DOCUMENTS

| CN | 105121121 A | 12/2015 |
| CN | 206644251 U | 11/2017 |

(Continued)

OTHER PUBLICATIONS

Italian Search Report dated Oct. 23, 2018. 7 pages.
Office Action dated Jan. 12, 2021 in connection with Japanese Patent Application No. 2019-009617 (3 pages).

*Primary Examiner* — Emmanuel S Luk
(74) *Attorney, Agent, or Firm* — RMCK Law Group PLC (57) ABSTRACT

Apparatus for injection molding of plastic materials having a mold including at least one plate, a hot runner distributor of the fluid plastic material, at least one injector and an electric motor for controlling opening and the closing of the injector, supported by the distributor and whose cooling is carried out by means of thermal exchange contact with the plate. Provided for the cooling of the electric motor is at least one cover made of thermally conductive material at least partly surrounding the electric motor in a slidable manner and it is maintained in thermal exchange contact with the plate by means of a magnetic or an electro-magnetic force.

19 Claims, 12 Drawing Sheets

(51) Int. Cl.
*B29C 45/74* (2006.01)
*B29C 45/28* (2006.01)
B29C 45/72 (2006.01)

(52) U.S. Cl.
CPC ...... *B29C 45/74* (2013.01); *B29C 2045/1776* (2013.01); *B29C 2045/2824* (2013.01); *B29C 2045/7271* (2013.01)

(58) Field of Classification Search
CPC .... B29C 2045/7271; B29C 2045/2824; B29C 45/1775; B29C 2045/1776
See application file for complete search history.

(56) References Cited

U.S. PATENT DOCUMENTS

| | | | | |
|---|---|---|---|---|
| 7,125,246 | B2 * | 10/2006 | Schmidt | B29C 45/2701 425/572 |
| 7,214,048 | B2 * | 5/2007 | Kim | B29C 45/281 425/566 |
| 7,931,455 | B2 * | 4/2011 | Tabassi | B29C 45/281 425/572 |
| 8,113,819 | B2 * | 2/2012 | Mohammed | B29C 45/27 425/566 |
| 8,308,476 | B2 * | 11/2012 | Tabassi | B29C 45/281 425/572 |
| 8,349,244 | B2 * | 1/2013 | Wernz | B23P 17/04 425/572 |
| 9,144,929 | B2 * | 9/2015 | Tan | B29C 45/7613 |
| 9,144,930 | B2 * | 9/2015 | Olaru | B29C 45/74 |
| 9,346,206 | B2 * | 5/2016 | Bazzo | B29C 45/281 |
| 9,352,501 | B2 * | 5/2016 | Stone | B29C 45/281 |
| 9,492,960 | B2 * | 11/2016 | Galati | B29C 45/281 |
| 9,682,504 | B2 * | 6/2017 | Tan | B29C 45/2725 |
| 9,724,861 | B2 * | 8/2017 | Antunes | B29C 45/2703 |
| 9,944,006 | B2 * | 4/2018 | Tan | B29C 45/2806 |
| 9,981,414 | B2 * | 5/2018 | Bazzo | B29C 45/2806 |
| 9,987,783 | B2 * | 6/2018 | Tan | B29C 45/281 |
| 10,046,496 | B2 * | 8/2018 | Tan | B29C 45/281 |
| 10,052,801 | B2 * | 8/2018 | Galati | B29C 45/281 |
| 10,166,709 | B2 * | 1/2019 | Tan | B29C 45/7331 |
| 10,569,458 | B2 * | 2/2020 | Galati | B29C 45/76 |
| 2005/0123641 | A1 * | 6/2005 | Kim | B29C 45/281 425/566 |
| 2006/0222726 | A1 * | 10/2006 | Tooman | B29C 45/281 425/146 |
| 2009/0102099 | A1 * | 4/2009 | Feick | B29C 45/281 425/566 |
| 2010/0047383 | A1 * | 2/2010 | Tabassi | B29C 45/2896 251/89 |
| 2010/0092588 | A1 * | 4/2010 | Tabassi | B29C 45/281 425/3 |
| 2010/0124579 | A1 * | 5/2010 | Tabassi | B29C 45/281 425/562 |
| 2012/0225148 | A1 * | 9/2012 | Tabassi | B29C 45/281 425/3 |
| 2012/0231109 | A1 * | 9/2012 | Lee | B29C 45/2737 29/428 |
| 2013/0316039 | A1 | 11/2013 | Blais et al. | |
| 2014/0041192 | A1 | 2/2014 | Lee | |
| 2014/0353875 | A1 * | 12/2014 | Tan | B29C 45/2806 425/549 |
| 2016/0082634 | A1 * | 3/2016 | Tan | B29C 45/281 29/890.121 |
| 2016/0208951 | A1 * | 7/2016 | Singh | B29C 45/281 |
| 2017/0100869 | A1 * | 4/2017 | Tan | B29C 45/7331 |

FOREIGN PATENT DOCUMENTS

| | | |
|---|---|---|
| JP | S61268421 A | 11/1986 |
| JP | H1097924 A | 4/1998 |

* cited by examiner

FIG. 22

APPARATUS FOR INJECTION MOLDING OF PLASTIC MATERIALS

CROSS-REFERENCE TO RELATED APPLICATIONS

This application is a continuation-in-part of U.S. Non-Provisional patent application Ser. No. 16/251,134 filed Jan. 18, 2019, which claims priority to Italian Patent Application No. 102018000003490 filed Mar. 13, 2018. The disclosure of each of the above applications is incorporated herein by reference in its entirety.

FIELD OF THE INVENTION

The present invention refers to apparatus for injection molding of plastic materials of the type comprising a mold having a cavity and including at least one plate, a hot runner distributor of the fluid plastic material, at least one injector for the introduction of the plastic material from the distributor into the mold cavity, and an actuator for controlling the opening and closing of the injector.

More in particular, the invention refers to molding apparatus thus made wherein the actuator which actuates the injector, typically provided with a valve pin axially displaceable between a full closing position and a maximum opening position of the injector, consists of an electric motor supported by the distributor, or by any plate of the mold, located above the injector with its axis coaxial with the injector axis, or arranged laterally offset thereto with its axis arranged parallelly or transversely to the injector axis.

STATE OF THE PRIOR ART

During the operation of the molding apparatus the electric motor is subjected to heating by means of the heat of the distributor, and can be conventionally cooled by means of an autonomous cooling hydraulic circuit. In some applications, even characterised by high temperatures of the mold, there arises the desire that the electric motor be without a cooling circuit so as to simplify the molding apparatus further. The heat of the electric motor must however be dissipated, and solutions in which the cooling of a fluid actuator occurs by means of thermal exchange with the aforementioned at least one mold plate were proposed for this purpose. As concerns this, it should be observed that the expression "mold plate" is used to indicate, in the description and in the claims that follow, the so-called mold clamping plate, as a whole or in relation with a component thereof in that it can consist of several adjacent plates, or the die i.e. the fixed part of the mold, or a plate of the distributor, as well as the plane of the press of the injection apparatus or an auxiliary plate.

Solutions in which the cooling of the actuator, namely consisting of a fluid actuator, is performed by means of the thermal exchange with a metal plate of the apparatus are for example disclosed by documents WO-2009/052611 to Mold Masters and documents WO-2011/119791 and US-2014041192, U.S. Pat. Nos. 8,349,244, 8,562,336, 8,728,378, EP-2550144, EP-2631059, WO-2015/183332, U.S. Pat. No. 9,682,504, US-2017/0246784, EP-3240666, US-2016/0361856, WO-2016/153608, WO-2016/153632, WO-2016/153703, WO-2016/153704 and WO-2016/153705 to Synventive Molding Solutions.

Provided in these prior art solutions is an elastic thrust member, typically consisting of or including a metal spring, interposed between the cylinder of the hydraulic jack and the plate with the aim of guaranteeing the thermal exchange contact irrespective of the thermal dilation phenomena of the hot runner which supports the hydraulic jack directly or indirectly. The use of plastic thrust members is also considered necessary by the prior art so as not to have to demand high precision machining of the mold plate/s against which the cylinder of the actuator must be kept at thermal exchange contact.

The use of such elastic members entails construction complications and thus considerable costs as well as poor reliability, and the thermal exchange surface between actuator and the plate made available by such elastic members is generally limited and thus scarcely efficient.

SUMMARY OF THE INVENTION

The object of the present invention is to overcome the aforementioned drawbacks and provide an apparatus for injection molding of plastic materials of the type defined above that allows to obtain an efficient thermal exchange cooling between the actuator, namely the electric motor, and the mold plate in a more simple, economic and functional manner.

With the aim of attaining subject object, the main and peculiar characteristic of the invention resides in that for the cooling of the electric motor provided for is at least one cover made of thermally conductive material that at least partly surrounds the body of the motor in an axially slidable manner and is kept in thermal exchange contact with the said at least one plate by a magnetic or an electro-magnetic force.

Such a cover has a planar radial wall faced to the motor and defining a flat surface at contact with said at least one plate. Such radial wall may be restrained against the plate by a magnetic or electro-magnetic attractive or repulsive force, possibly assisted by a pressurised fluid or by a pneumatic or hydraulic thrust, or by an electrical drive force, or by combinations thereof.

The cover may be generally L-shaped, with a portion extending parallelly to the injector and at right angle relative to the planar radial wall.

A radial gap is provided between the cover and the housing of the electric motor, and such a gap may be conveniently maintained permanently so as to prevent jamming: to this effect the housing of the electric motor and the cover are made of materials having different coefficients of linear thermal deformation.

To further guarantee provision of the gap guide means can provided between the housing of the electric motor and the cover.

The invention applies both to the case where the electric motor is directly fixed to the hot runner, and in such case the aforementioned at least one plate may consist in the mold clamping plate or in the hot runner plate, or it can be indirectly fixed to the hot runner, laterally thereto, and in such case the aforementioned at least one plate consists of the die plate or hot runner plate. Alternatively, the aforementioned at least one plate may consist of an element of the press of the molding apparatus or an auxiliary plate.

BRIEF DESCRIPTION OF THE DRAWINGS

The invention will now be described in detail with reference to the attached drawings, provided purely by way of non-limiting example, wherein.

DETAILED DESCRIPTION OF THE INVENTION

An apparatus for injection molding of plastic materials conventionally comprises a press (not illustrated) for sending the fluid plastic material to a distributor or hot runner 1 from which the plastic material is injected into the mold cavity (not illustrated) through one or more injectors. The injector comprises a displaceable valve pin 2, relatively to a mold gate, between a full closing position and a maximum opening position. The displacement of the valve pin 2, and thus the opening and closing of the injector, is performed by an actuator which, in the case of the present invention, consists of an electric motor indicated as 3, arranged coaxially above the injector 2.

The housing 4 of the electric motor 3 is at least partly, and preferably almost entirely, surrounded by a cover 7 which shall be further disclosed in better detail.

It is to be pointed out that the term "housing" of the electric motor 3 as used herein is intended to designate a body having not only a quadrangular cross section but also any other shape such as a circular or elliptical or polygonal cross section, even in order to increase the amount of thermal exchange between the housing 4 of the motor 3 and the cover 7 and thus the amount of cooling of the electric motor 3.

Figures 1, 2:
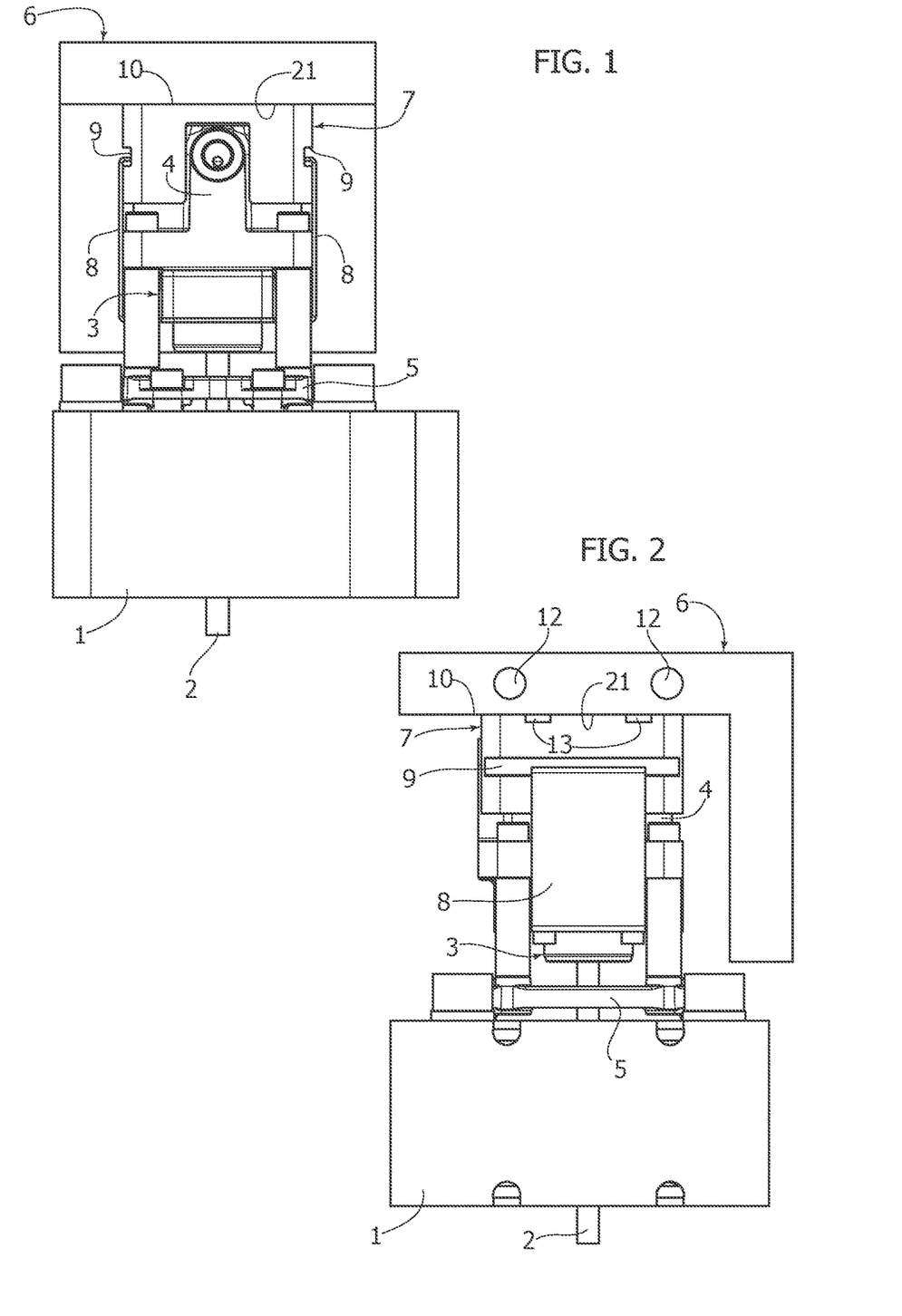
FIG. 1 is a front elevational schematic view of a part of the molding apparatus for injection molding of plastic materials according to the invention.
FIG. 2 is a lateral elevational view of FIG. 1.
Figure 3:
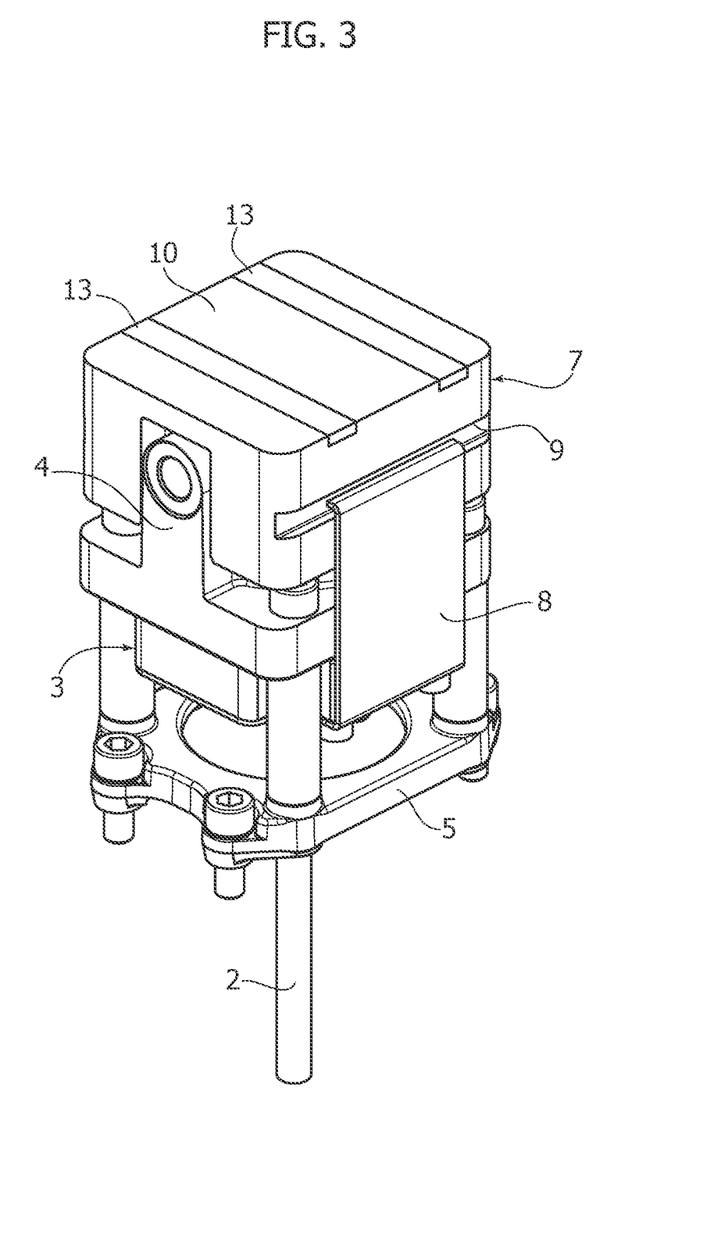
FIG. 3 is a perspective view of FIG. 1.

The housing 4 of the electric motor 3 is supported by the distributor 1: in the case of the embodiments represented in FIGS. 1 to 3 the motor is directly fixed onto the distributor 1, by means of a fixing unit generally indicated with 5. Alternatively, the housing 4 of the electric motor 3 may be indirectly fixed to the distributor 1, for instance over or alongside the latter, as further disclosed hereafter for instance with reference to FIGS. 4 and 5.

The electric motor 3 is normally without an autonomous cooling circuit that conventionally uses a cooling liquid, and the cooling thereof occurs by means of thermal exchange contact with a plate of the molding apparatus. Such plate may include any mold plate and in particular, as in the case of FIGS. 1 to 3, it consists of the clamping plate of the mold indicated as 6. Alternatively, this could be a component of such clamping plate or of the distributor or of the hot runner plate (not represented) or of the die (not represented) of the mold in the case where the electric motor 3 is arranged laterally to the hot runner 1, as for instance in the case of FIGS. 4 and 5.

It should be observed that the clamping plate 6 or other plates (not shown) can be provided with a liquid cooling circuit, indicated as 12, or it can be without.

Figure 8:
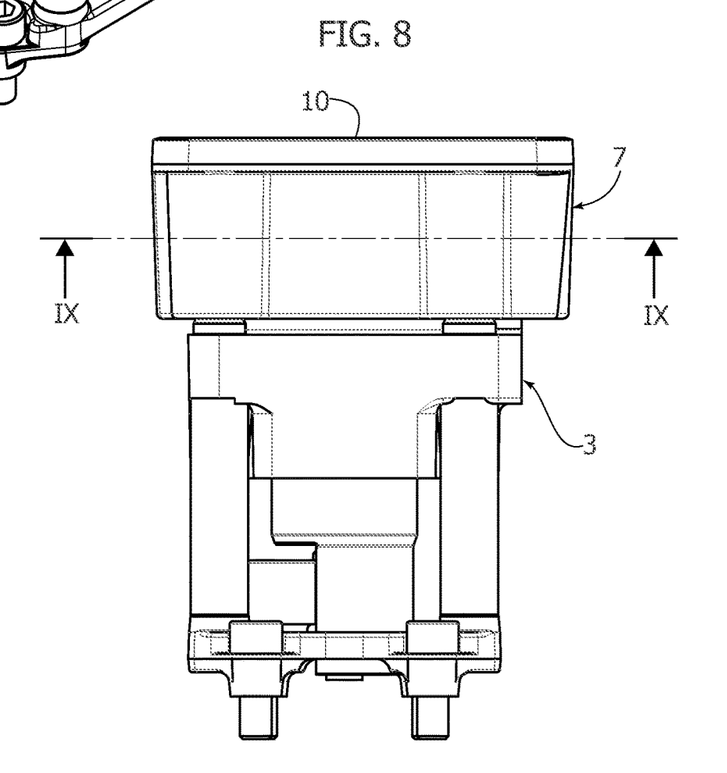
FIG. 8 is an elevational view of FIG. 7.
Figure 9:
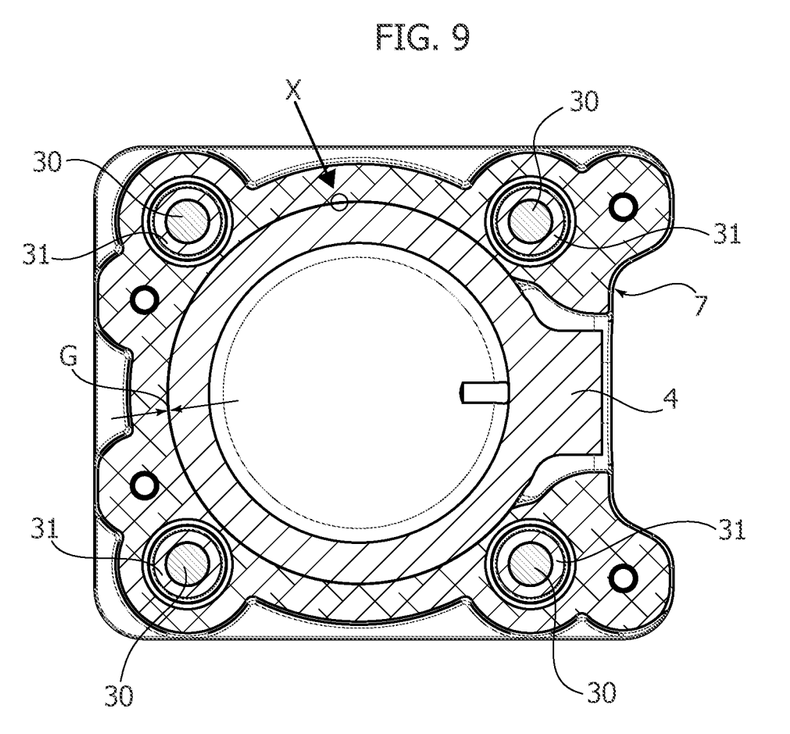
FIG. 9 is a cross section along line IX-IX of FIG. 8.

In order to guarantee the thermal exchange contact between the housing 4 of the electric motor 3 and the clamping plate 6 the invention provides for, in place of a thrust spring member like in the case of the prior art, the cover 7 which is made of thermally conductive material and at least partly, and preferably for a substantial and almost full perimeter width, surrounds the housing 4 of the electric motor 3. This cover 7 is axially slidable relative to the outer surface of the housing 4 of the electric motor 3 for a stroke of limited degree by means of one or more C-shaped lateral bands 8 engaged—at one end—with the housing of the electric motor 3 and—at the opposite end—an axial clearance in a groove 9 of the cover 7, as better observable in FIG. 8.

A radial gap G is provided between housing 4 of the electric motor 3 and the cover 7.

Preferably the housing 4 of the electric motor 3 and the cover 7 are made of materials having different coefficients of linear thermal deformation. Namely, the coefficient of linear thermal deformation of the housing 4 of the electric motor 3 is lower than the coefficient of linear thermal deformation of the cover 7: this ensures that the radial gap G may be permanent, i.e. it can be maintained constantly during operation of the apparatus. For instance, the housing 4 of the electric motor 3 is conveniently made of cast iron and the cover 7 is conveniently made of aluminium.

The minimum amount of the radial gap G can be conveniently in the range of at least 0.01 mm. under cold conditions, i.e. when the apparatus is not operating, and in the range of at least 0.05 mm. under hot conditions, i.e. when the apparatus is operating.

The cover 7 may have a generally L-shaped or U-shaped section with an end radial wall 10 facing the bottom plate 11 of the housing of the electric motor 3 and defining a flat surface at planar contact with the clamping plate 6. The lateral wall of the cover 7, indicated as 22, is in sliding thermal exchange with the housing 4 of the electric motor 3.

The bottom plate 11 may consist of an element separated from the housing 4 of the electric motor 3, or it can be made in a single piece with housing 4 of the electric motor 3.

In order to constantly maintain the wall 10 of the cover 7 in thermal exchange contact with the clamping plate 6, the invention provides for different alternative solutions among which the preferred one, represented in FIGS. 2 to 5, applies a magnetic or an electro-magnetic attractive force. To this end, incorporated in the radial wall 10 are permanent magnets facing the clamping plate 6 and cooperating therewith. It should be observed that the arrangement could be inverted, namely the magnets 13 could be fitted in the clamping plate 6.

The magnetic force may also be a repulsive force instead of an attractive force.

According to a further alternative solution not represented in the drawings, the thermal exchange contact between the cover 7 and the clamping plate 6 can be obtained by means of an electrical drive force, or through an electric actuator configured for pushing, by means of a transmission known to a man skilled in the art, the transversal wall 10 against the plate 6.

It should be observed that the various alternatives described above could be combined with each other: so that the pneumatic thrust, the hydraulic thrust and the electrical drive force could be combined with each other and/or with the magnetic attraction.

Figure 4:
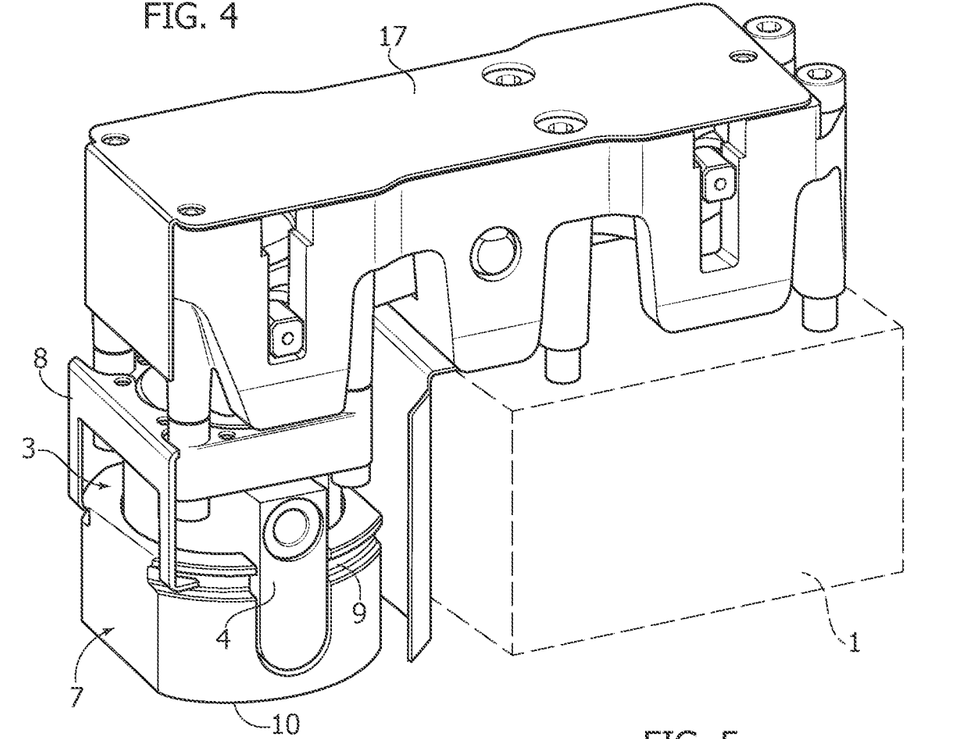
FIG. 4 is a perspective view showing a variant of FIG. 3.
Figure 5:
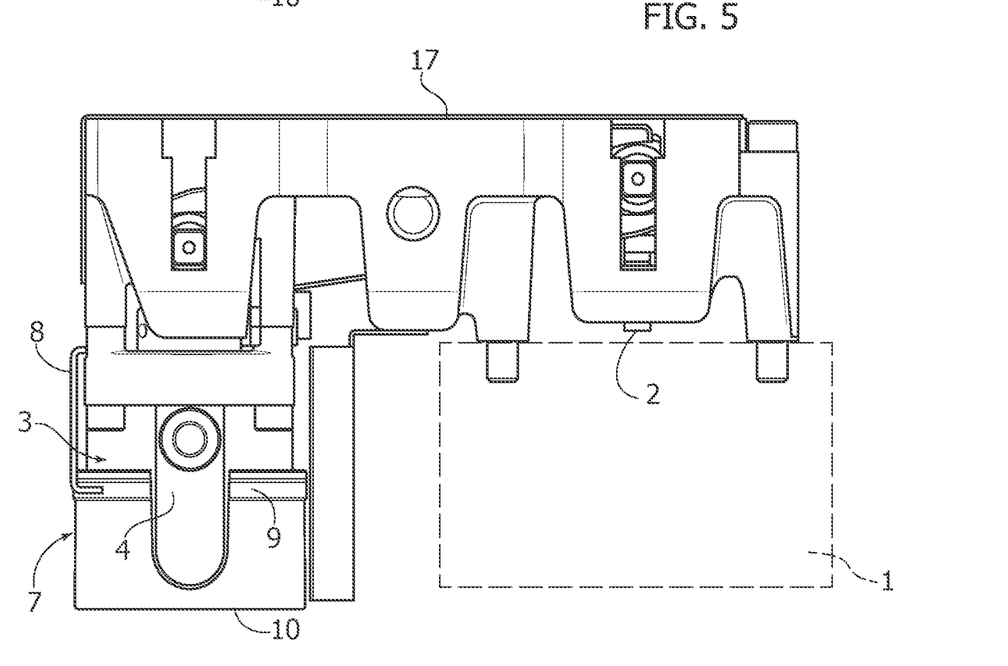
FIG. 5 is an elevational view of FIG. 4.

As previously mentioned, the housing 4 of the electric motor 3 can be fixed, instead of directly onto the hot runner 1, laterally thereto such as for example represented in FIGS. 4 and 5. In this case, the housing 4 of the electric motor 3 with the cover 7 is carried by a support or plate 17 through a mechanical transmission (for instance including a swinging lever or a gear train) for the actuation of the valve pin 2 of the injector (not visible in these figures). The radial wall 10 of the cover 7 is in this case kept at thermal exchange contact, by means of one or more of the previously described alternatives, using a mold plate different from the clamping plate 6 and for example consisting of the die plate or in the hot runner plate or an auxiliary plate, not represented in the drawings since well known to a man skilled in the art.

According to a further alternative not represented in the drawings, the plate against which the cover 7 is in thermal exchange contact can consist of the plane or another element—magnetic or non-magnetic—of the molding apparatus and the relative press to which the mold is associated.

Figure 6:
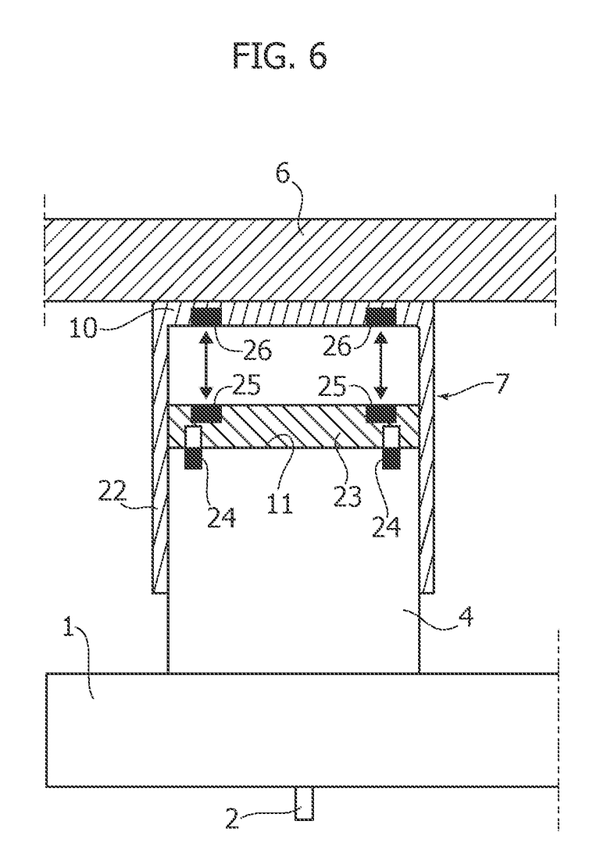
FIG. 6 is a schematic sectioned view showing a further variant of the invention.

In the further variant of the invention schematically represented in FIG. 6, besides the cover provided for is an auxiliary element 23 made of thermally conductive material kept at front thermal exchange contact against the bottom plate 11 of the housing 4 of the electric motor 3 and arranged at thermal exchange slidable lateral contact with the lateral wall 22 of the cover 7. Thus, the heat dissipation of the electric motor 3 occurs in an even more efficient manner.

The auxiliary element 23 is kept at constant contact with the bottom plate 11 for example by means of the attraction force obtained by the permanent magnets 24. Furthermore, there can be further provided for permanent magnets 25, 26 respectively carried by the auxiliary element 23 and by the plate 6 and configured so as to obtain a magnetic repulsive force suitable to press the radial wall 10 of the cover 7 against the plate 6.

The magnets 26 can also be directly applied to the bottom plate 11 of the housing 4 should the auxiliary element 23 not be present, and the magnetic repulsive force can also be combined with a pressurised fluid thrust and/or with an electrical drive force, as described previously.

It should be observed that the thermal exchange contact between the cover 7 and the plate 6 can be obtained not only by the radial wall 10 but also by the lateral wall 22. This lateral contact can be obtained directly, and in this case the lateral wall 22 will be at least partly inserted into a recess or complementary seat of the plate 6 or of an element of the mold, or indirectly by means of an intermediate element fixed to the plate.

In the light of the above it will be clear that the invention is capable of ensuring, during the operation of the molding apparatus, an efficient heat dissipation of the electric motor 3 in a constructively easy and economic manner.

Additional embodiments of the invention are depicted in FIGS. 7 to 10 and in FIGS. 11 to 15.

Figure 7:
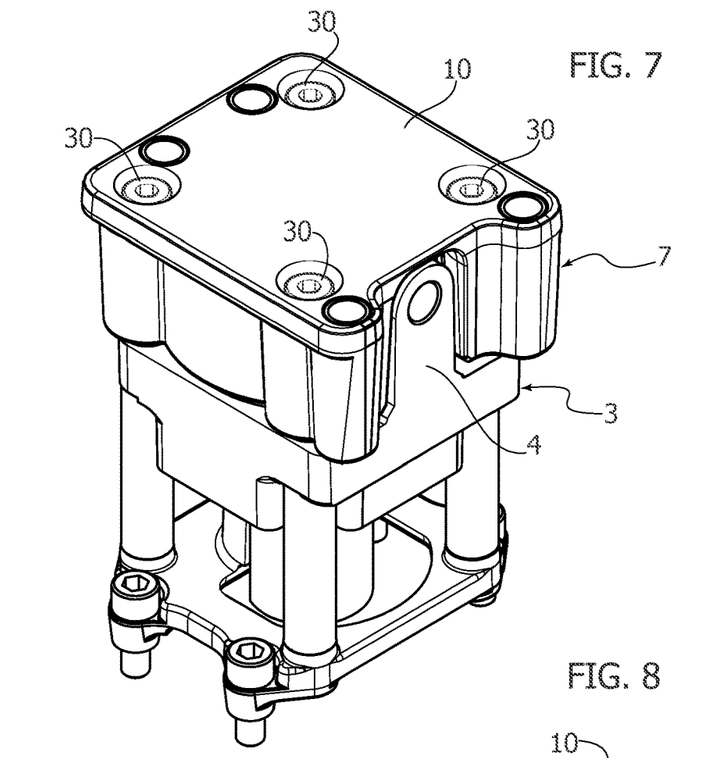
FIG. 7 is a perspective view of a further variant of the invention.
Figure 10:
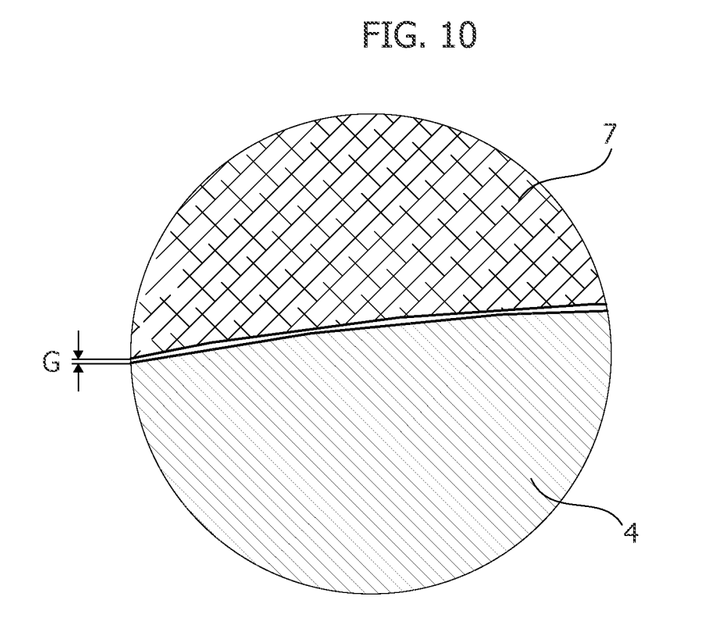
FIG. 10 is an enlarged view according to arrow X of FIG. 9.
Figure 11:
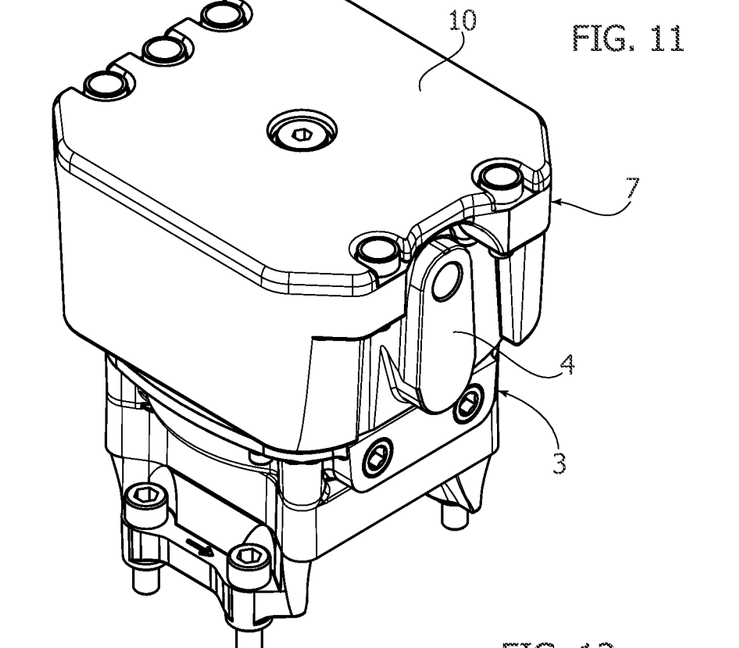
FIG. 11 is a perspective view of a further variant of the invention.
Figure 12:
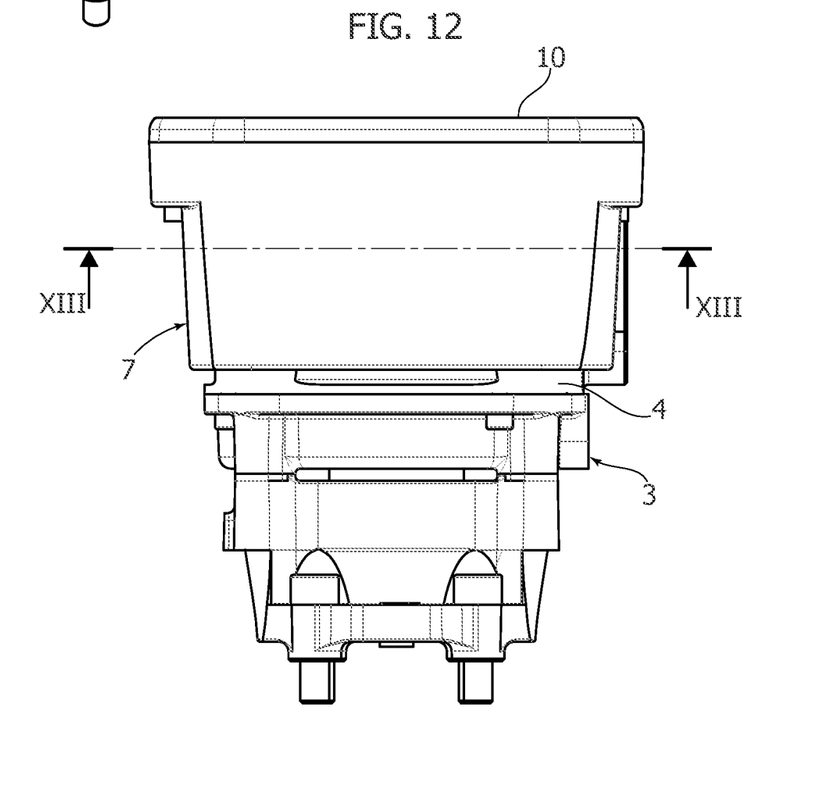
FIG. 12 is an elevational view of FIG. 11.
Figure 13:
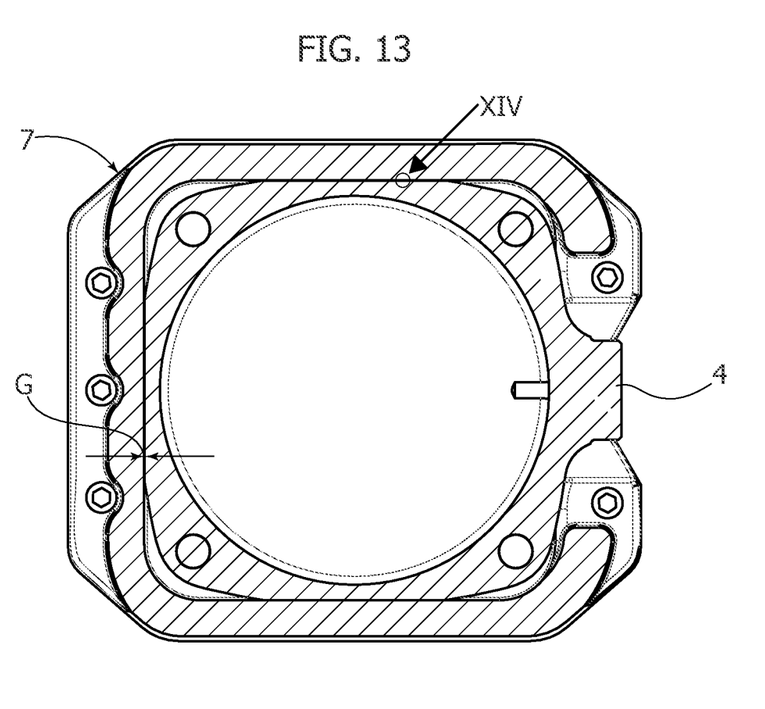
FIG. 13 is a cross section along line XIII-XIII of FIG. 13.
Figure 14:
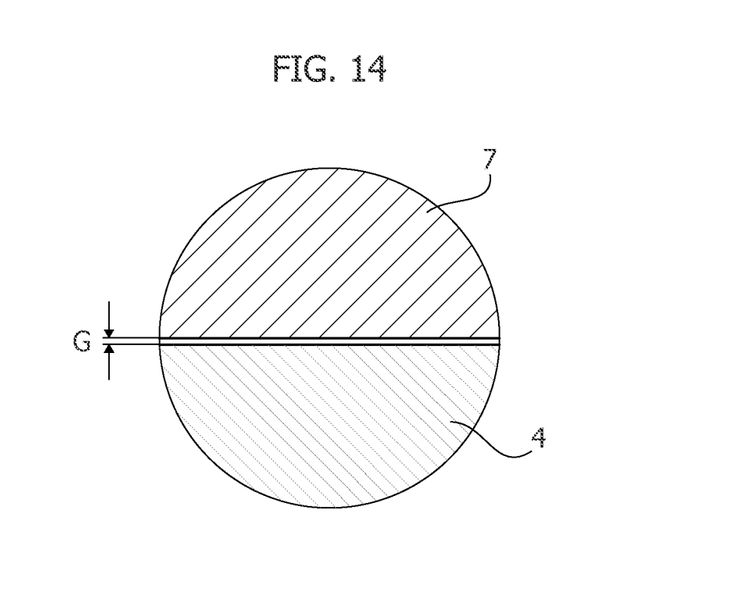
FIG. 14 is an enlarged view according to arrow XIV of FIG. 19.
Figure 15:
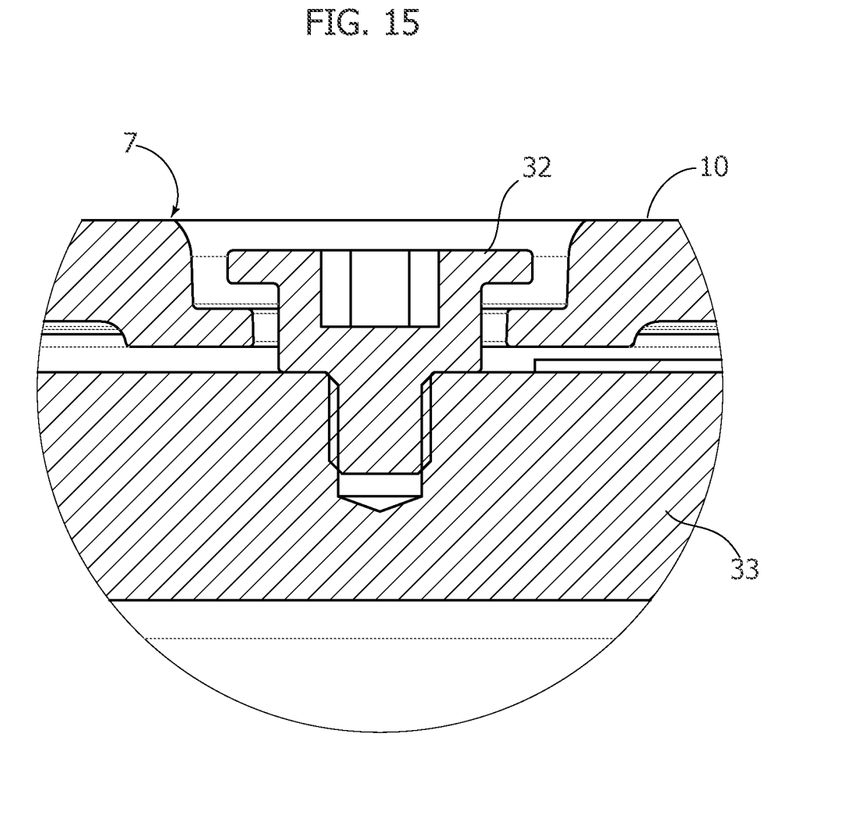
FIG. 15 is an enlarged sectioned view of a detail of the invention.
Figure 16:
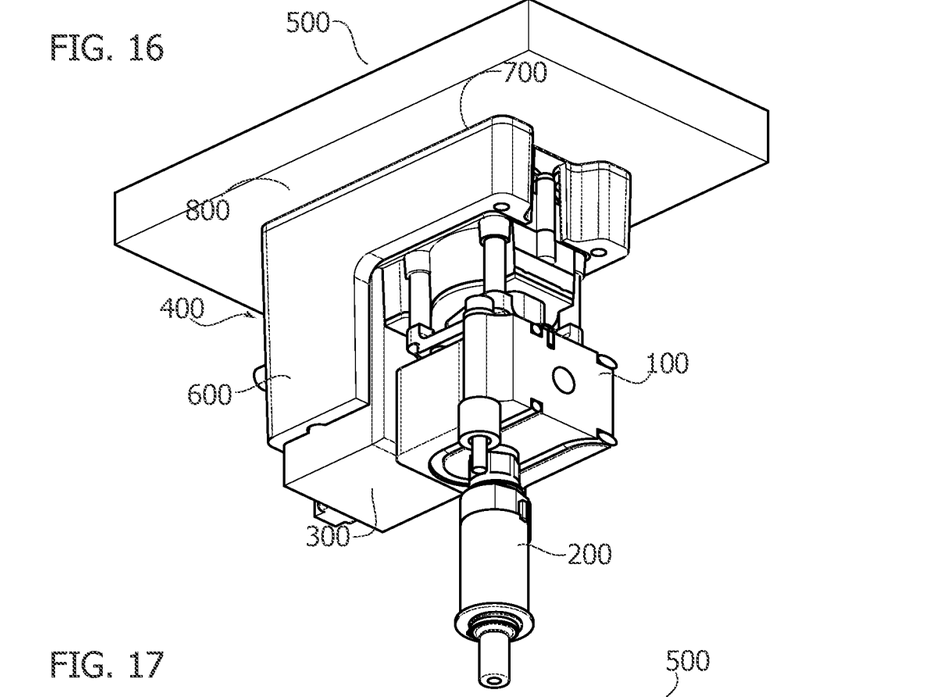
FIG. 16 is a perspective view of a further variant of the invention.
Figure 17:
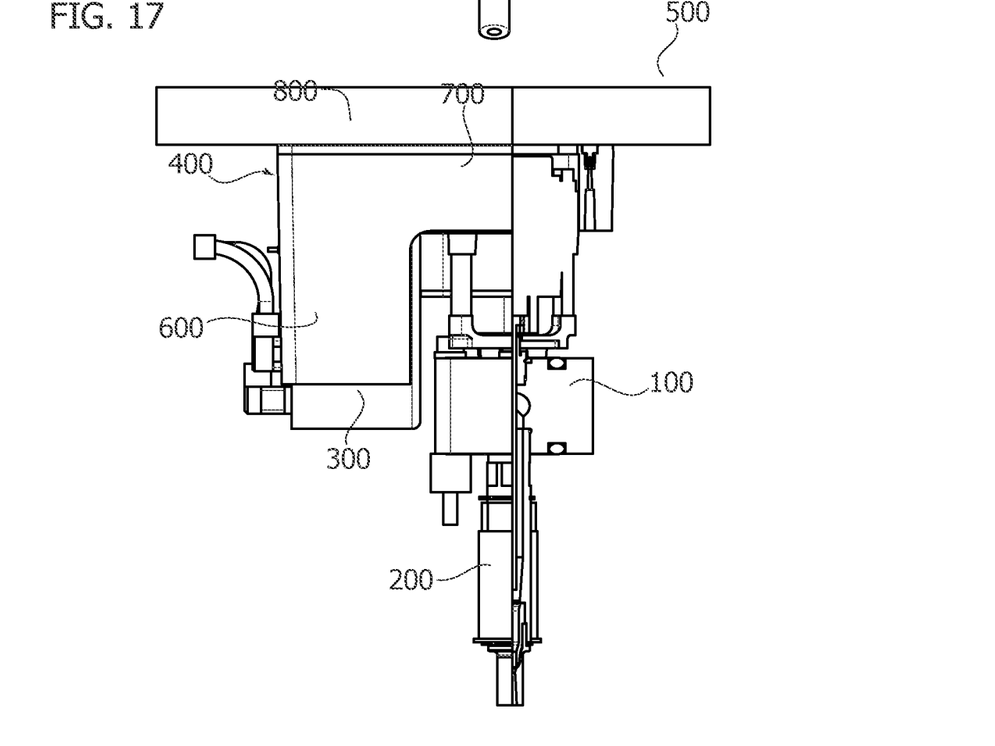
FIG. 17 is a side elevational and partly sectioned view of FIG. 16.
Figure 18:
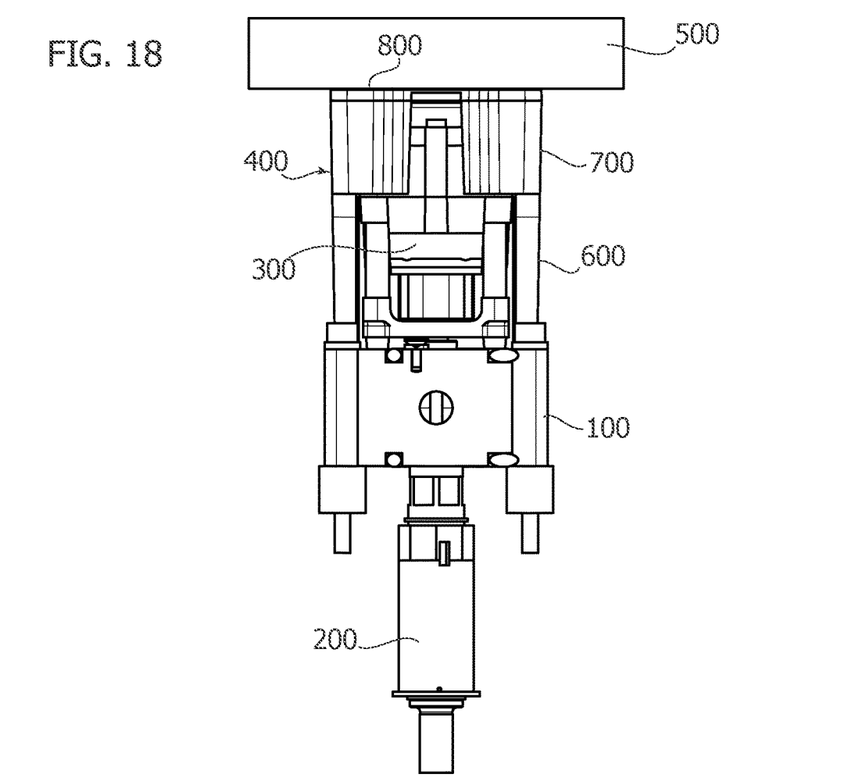
FIG. 18 is a front view of FIG. 17.

The radial gap between the housing 4 and the cover 7 is better seen and referenced as G in FIGS. 10 and 14, respectively, and the constant presence of such a gap G may also ensured by axial guide means provided between the housing 4 of the electric motor and the cover 7. In the example of FIGS. 7 and 10 these guide means comprise four studs 30 fitted within retaining bushes 31 of the housing 4, while in the example of FIGS. 11-15 these guide means comprise a single retaining screw 32 provided centrally with a certain amount of axial play between the planar wall 10 of the cover 7 and the top wall 33 of housing 3.

Also in the further embodiment of FIGS. 16-20 the invention provides, in order to guarantee the thermal exchange contact between the housing of the electrical motor 300 and the plate 500, a cover 400 which is made of a thermally conductive material and at least partly, and preferably for a substantial and almost full perimeter width, closely surrounds the housing of the electrical motor 3.

The cover 400 is generally L-shaped, or even C-shaped, with a lower portion 600 extending parallelly to the injector 200 and enclosing the electric motor 300, and an upper portion 700 projecting at right angle with respect to the lower portion 600, above the hot runner. The upper portion 700 is defining a flat surface 800 in close contact with the plate 500 by virtue of that the upper portion 700 is restrained against the plate 500 by a magnetic or electro-magnetic attractive force, possibly even assisted by or by a pressurised fluid or by a pneumatic or hydraulic thrust, or still by an electrical drive force, or any combinations thereof.

In the shown example one or more permanent magnets 900 are embedded within the upper portion 700 of the cover 400 and exposed on the flat surface 800.

Radial gap G (FIG. 19) is provided between the cover 400 and the housing of the motor 300, namely between the lower portion 600 of the cover 400 and a lateral facing surface of the motor 300. Even in this embodiment such a gap may be conveniently maintained permanently: to this effect the housing of the motor 300 and the cover 400 can be made of materials having different coefficients of linear thermal deformation. Namely, the coefficient of linear thermal deformation of the housing of the motor 300 is lower than the coefficient of linear thermal deformation of the cover 400: this ensures that the radial gap G may be permanent, i.e. it may be maintained constantly during operation of the apparatus. For instance, the housing of the electric motor 300 is conveniently made of cast iron and the cover 400 can be made of aluminium.

Figure 19:
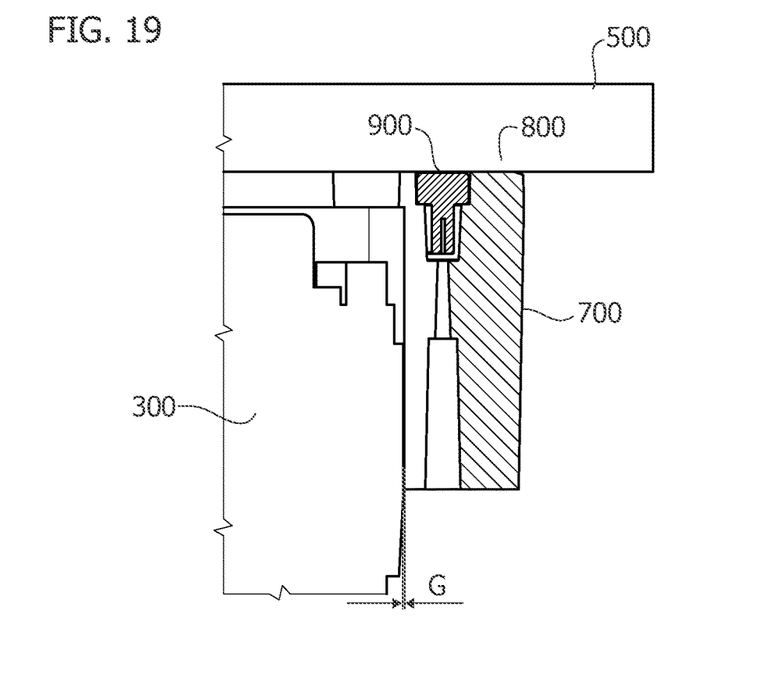
FIG. 19 is an enlarged and partly sectioned view of a detail of FIG. 17.

Also in this embodiment the minimum amount of the radial gap G can be conveniently in the range of at least 0.01 mm. under cold conditions, i.e. when the apparatus is not operating, and in the range of at least 0.05 mm. under hot conditions, i.e. when the apparatus is operating.

Guide means consisting for instance of stud or screws also can be provided between the housing of the motor 300 and the cover 400, as in the previously disclosed embodiments.

The magnetic or electro-magnetic force between the flat surface 800 and the plate 500 may be a repulsive force instead of an attractive force. Even in this case, in order to further enhance the thermal exchange contact between the cover 400 and the plate 500, the magnetic force can also be assisted by means of a pneumatic thrust provided by a pressurised fluid or by an electrical drive force provided by respective actuators (not shown) configured for pushing, by means of a transmission which is well within the skill of the practitioner, the cover 400 against the plate 500.

It is also to be pointed out that the flat surface 800 of the cover 400 can be kept at thermal exchange contact, by means of one or more of the previously described alternatives, against a mold plate different from the clamping plate 500 and for example consisting of the die plate or the hot runner plate or an auxiliary plate, not represented in the drawings since well known to those skilled in the art.

According to a further alternative, the plate against which the cover 400 is in thermal exchange contact can consist of the plane or another element—magnetic or non-magnetic—of the molding apparatus and the related press to which the mold is associated, or an auxiliary plate.

Figures 20, 21, 22:
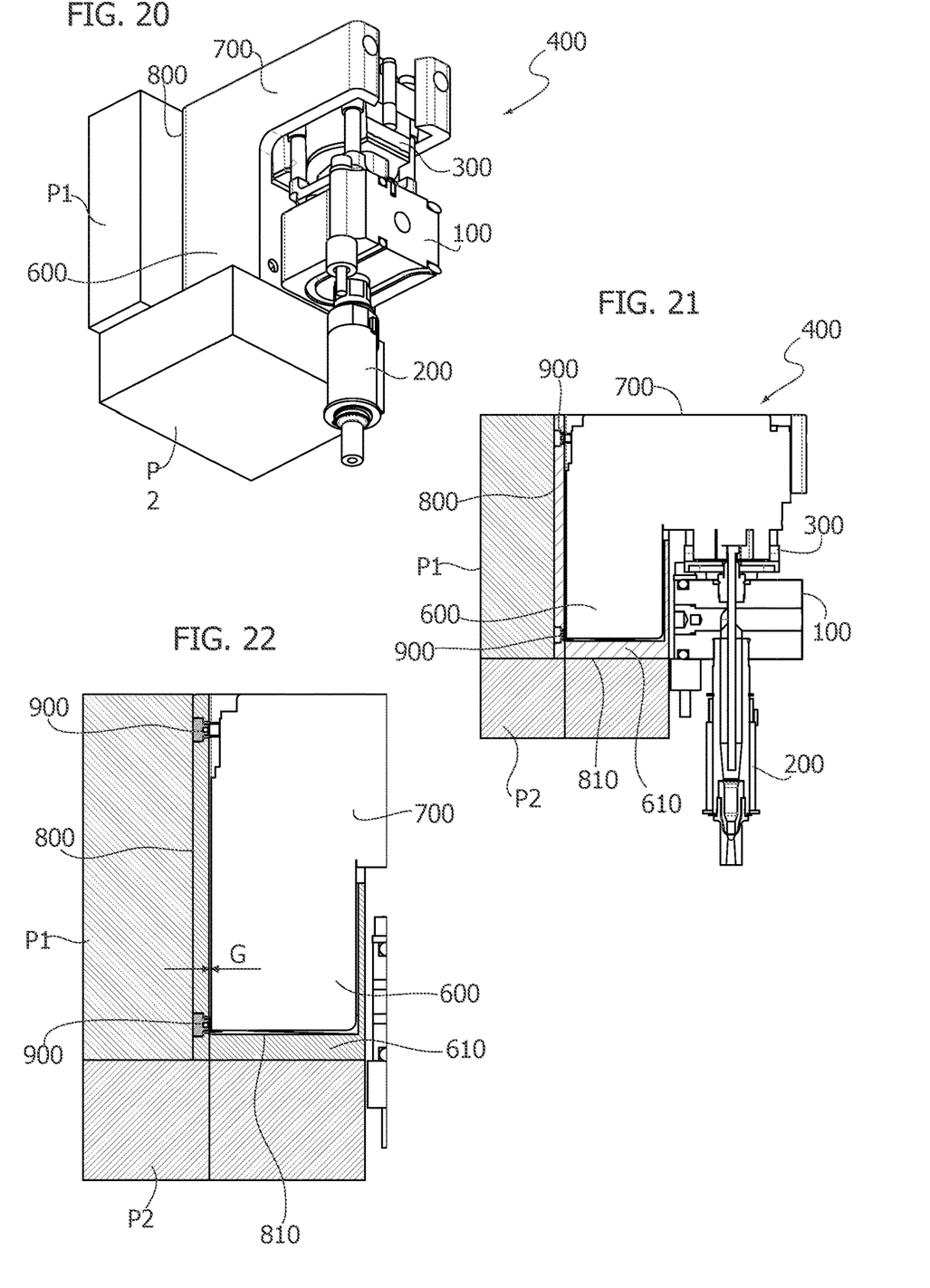
FIG. 20 is a perspective view of a further variant of the invention.
FIG. 21 is a side elevational and partly sectioned view of FIG. 20.
FIG. 22 is an enlarged view of a detail of part of FIG. 21.

In the embodiment of FIGS. 20 to 22 the flat surface 800 of the cover 400 is extending axially instead of radially with respect to the electric motor 300, along the lower and upper portions 600, 700 of the cover 400. This flat surface 800 is kept in contact of thermal exchange against a lateral vertical plate P1 of the mold by the action of lower and upper magnets 900. The lower portion 600 defines an additional flat surface 810 extending radially with respect to the electric motor 300 and resting upon a lateral horizontal plate P2 of the mold. Contact of thermal exchange is thus provided both axially and radially between the cover 400 and plates P1, P2.

In light of the above it will be clear that the invention is capable of ensuring, during the operation of the molding apparatus, an efficient heat dissipation of the electric motor in a constructively easy and economic manner.

Obviously, the construction details and the embodiments may widely vary with respect to what has been described and illustrated, without departing from the scope of protection of the invention as described in the claims that follow. Thus, even if the above description is contemplating the housing of the electric motor and the cover being slidable relative to each other parallelly to the injector, said housing and said cover could be slidable relative to each other transversely to the injector. Further, the electric motor could also be arranged with its axis perpendicular instead of parallel to the injector. Moreover the electrical motor could also be supported, instead of by the hot runner, by any plate of the mold.

The invention claimed is:

1. An apparatus for injection molding of plastic material comprising a mold, at least one plate, a hot runner distributor of the fluid plastic material, at least one injector for injecting the plastic material from the hot runner distributor into the mold, and an actuator for controlling opening and closing of the at least one injector and including an electric motor, wherein the electric motor has a housing and cooling thereof is performed by means of thermal exchange contact with said at least one plate, wherein for the cooling of the electric motor there is provided a cover made of thermally conductive material at least partly surrounding the housing of the electric motor in a slidable fashion to provide thermal exchange between the housing and the cover to cool the actuator, the cover maintained in thermal exchange contact with said at least one plate by a magnetic force, wherein said cover has at least one planar wall defining a surface of contact with said at least one plate, and wherein a radial gap is provided between said cover and said housing of the electric motor.

2. The apparatus according to claim 1, wherein said radial gap is provided permanently.

3. The apparatus according to claim 1, wherein said housing of the electric motor and said cover are made of materials having different coefficients of linear thermal deformation.

4. The apparatus according to claim 3, wherein the coefficient of linear thermal deformation of said housing of the electric motor is lower than the coefficient of linear thermal deformation of said cover.

5. The apparatus according to claim 4, wherein said housing of the electric motor is made of cast iron and said cover is made of aluminium.

6. The apparatus according to claim 1, wherein said radial gap is in a range of at least 0.01 mm under cold conditions.

7. The apparatus according to claim 1, wherein said radial gap is in a range of at least 0.05 mm under hot conditions, such as when the apparatus is operating.

8. The apparatus according to claim 1, wherein guide members are provided between said housing of the electric motor and said cover.

9. The apparatus according to claim 1, wherein said magnetic force is an attractive force.

10. The apparatus according to claim 9, wherein at least one from among said at least one planar wall and said at least one plate incorporates at least one permanent magnet.

11. The apparatus according to claim 1, wherein said magnetic force is an electro-magnetic force.

12. The apparatus according to claim 1, wherein said electric motor is supported by the hot runner distributor or by any other plate of the mold.

13. The apparatus according to claim 1, wherein said electric motor is directly fixed to the hot runner distributor and said at least one plate is a mold clamping plate or a mold plate or a hot runner plate or an auxiliary plate.

14. The apparatus according to claim 1, wherein said electric motor is indirectly fixed to the hot runner distributor and said at least one plate is a die plate or a hot runner plate or an auxiliary plate.

15. The apparatus according to claim 1, wherein said at least one plate is an element of the injection apparatus.

16. The apparatus according to claim 1, wherein said magnetic force is repulsive force.

17. The apparatus according to claim 1, wherein said cover is generally L or C-shaped, with a lower portion extending parallel to the at least one injector and enclosing the electric motor, and an upper portion projecting at right angle with respect to the lower portion, above the hot runner distributor; said upper portion defining said at least one planar wall.

18. The apparatus according to claim 1, wherein said electric motor and said cover are slidable relative to each other parallel to the at least one injector.

19. The apparatus according to claim 1, wherein said electric motor and said cover are slidable relative to each other transversely to the at least one injector.

* * * * *